Patented Dec. 20, 1949

2,491,834

UNITED STATES PATENT OFFICE 2,491,834

PRODUCTION OF 1,4-DIHALOBUTANES

Norman D. Scott, Sanborn, N. Y., assignor to E. I. du Pont de Nemours & Company, Wilmington, Del., a corporation of Delaware No Drawing. Application August 8, 1946, Serial No. 689,190

9 Claims. (Cl. 260—657)

This invention relates to the production of certain 1,4-dihalobutanes and more particularly to their preparation by a catalytic method from tetramethylene oxide, also called tetrahydrofuran.

1,4-dichlorbutane and the corresponding dibromide have been prepared from tetramethylene oxide by reaction with the appropriate hydrogen halide under pressure at elevated temperatures, either alone or in the presence of dehydrating agents such as concentrated sulfuric acid, glacial acetic acid, zinc chloride and other metal halides. When using such dehydrating agents the reaction does not proceed very readily at moderately high temperatures, particularly when the preparation of the dichloride is involved, in consequence of which relatively high temperatures, e. g., above 150° C. are generally required in order for the reaction to proceed at a practicable rate. When employing such higher temperatures with such dehydrating agents, substantial quantities of by-product ethers are formed and, particularly with dehydrating agents such as zinc chloride, considerable side reactions occur with the resultant formation of substantial quantities of tarry products. Such products decrease the efficiency of the dehydrating agents and necessitate periodically replacing the agent which, of course, is costly.

It is an object of the present invention to provide an improved method of preparing 1,4-dibrombutane and 1,4-dichlorbutane. A further object is an improved method of preparing such compounds from tetramethylene oxide which is simple in operation and suitable for use on a commercial scale, whereby high yields of the desired products may be obtained. A particular object is to provide an improved method of preparing 1,4-dichlorbutane from tetramethylene oxide in high yields by the catalytic reaction of hydrogen chloride with tetramethylene oxide. Further objects will be apparent from the ensuing description.

The above objects are accomplished in accordance with the invention by reacting tetramethylene oxide with hydrogen chloride or hydrogen bromide in the presence of an amine salt catalyst of the class defined below.

The amine salts which are suitable for use as catalysts in accordance with the invention are those compounds of the following general formula:

wherein each R substituent is hydrogen or an alkyl or aralkyl radical, Y is a alkyl radical and X is either chlorine or bromine. The preferred catalysts are those amine salts which are aliphatic compounds, i. e., contain no non-aliphatic radicals, in which each of at least two of the R substituents in the above general formula is an alkyl radical. In other words, the preferred catalysts are the aliphatic tertiary amine hydrochlorides and hydrobromides and the tetraalkyl quaternary ammonium chlorides and bromides. It has been discovered that these preferred amine salts are outstanding catalysts for the conversion of tetramethylene oxide to the above dihalides. The amine salt catalyst will of course be chosen so as to correspond with the hydrogen halide being reacted.

Specific examples of amine salts of the above general formula which are suitable for the present purposes are the hydrochlorides and hydrobromides of the following amines: mono-, di- and tri-alkyl amines having from 1 to 6 carbons per alkyl group, including mixed secondary and tertiary amines such as methylethylamine, methyldiethylamine, methylamylamine and methyldiamylamine. Amines having alkyl groups of higher carbon content such as the decyl and dodecyl groups may also be used, but those amines in which the alkyl groups contain less than 7 carbon atoms will generally find most use because they are more readily available. Branched chain amines may also be used. Other examples of suitable amine hydrohalides are those in which the R substituents in the above formula include at least one alkyl radical in addition to one or two aralkyl radicals, such as the hydrochloride of dimethylbenzylamine. Examples of suitable quaternary ammonium salts are tetramethyl ammonium chloride, tetraethyl ammonium chloride and trimethylbenzyl ammonium chloride and the like, especially those in which the alkyl radicals contain not more than 6 carbon atoms, and the corresponding bromides. The preferred tertiary amine hydrohalides and tetraalkyl ammonium halides are illustrated by triamylamine hydrochloride, tetramethyl ammonium chloride, tetraethyl ammonium chloride, and the corresponding bromides.

The invention may be practiced employing either a batch or continuous method of operation. When employing the batch method, the amine may be dissolved in the tetramethylene oxide to form a solution into which the hydrogen halide is passed. The hydrogen halide converts the amine to its hydrohalide salt which then functions as the catalyst. With the use of more hydrogen halide, the tetramethylene oxide is converted to the 1,4-dihalobutane and water by fission of the oxide ring. In the continuous method of operation, the tetramethylene oxide and hydrogen halide are added continuously, for example in stoichiometric quantities, to a catalytic reaction medium comprising the amine hydrohalide. The reaction medium should be maintained at a temperature at which it will be liquid, which temperature should be sufficiently high to cause the reaction to proceed at an effective rate and preferably sufficiently high to distill from the reaction medium the reaction products as they are formed. If the melting point of the catalyst is above the desired reaction temperature, sufficient quantities of water may be added to the catalyst to render the medium liquid at that temperature.

The conversion of tetramethylene oxide to the dihalobutanes will proceed at temperatures as low as about 60° C. when using the present catalysts. However, better conversions are obtained at higher temperatures and a temperature of 100° to 140° C. is preferred. Still higher temperatures, e. g. up to 200° C. may be used, but at such higher temperatures there is a tendency for the catalysts to decompose or volatilize upon prolonged use.

The reaction may be carried out smoothly employing an excess of either one of the reactants. It is preferred, however, that equivalent quantities of the reactants or an excess of tetramethylene oxide be employed, since under such circumstances substantial quantities of unreacted hydrogen halide in the reaction products are avoided. The presence of substantial quantities of hydrogen halide in the reaction product is generally undesirable since recovery thereof in salable form is not generally practicable. Furthermore, the presence of such an excess presents a very troublesome corrosion problem. When using an excess of the oxide the unreacted oxide may be effectively and conveniently recovered by well-known methods and recycled through the reactor so that no substantial loss will result. Reactants employed in the ratio of 1 to 1.5 mols of oxide to 2 mols of hydrogen halide and preferably 1.1 to 1.3 mols of oxide to each 2 mols of hydrogen halide give especially good results.

Catalyst concentrations in the reaction medium as low as 5 to 10% by weight of the medium are effective, although higher concentrations give better conversions. It is preferred to employ a reaction medium having at least 50 to 70% by weight of catalyst and when the continuous method is being used at a temperature sufficiently high to distill reaction products from the reaction medium as they are formed, the reaction medium will consist almost entirely of the amine salt catalyst.

The reaction between the tetramethylene oxide and the hydrogen halide may be carried out conveniently at atmospheric pressure with excellent results, although pressure either above or below atmospheric pressure may be advantageous under certain conditions and may be used.

The invention is further illustrated by the following example.

Example

One mol (72 grams) of tetramethylene oxide, 113 grams of tetraethyl ammoniumchloride and 19 cc. of water were placed in a 500 cc. reaction flask which was fitted with a stirrer, a reflux condenser, a thermometer and a gas inlet tube extending to near the bottom of the flask. The mixture was heated to reflux temperature and dry hydrogen chloride gas was passed into the reactor during a period of 8 hours. The temperature of the reaction mixture during the major part of the run was about 109° C. The reaction mixture was steam distilled and there was separated from the distillate a 1,4-dichlorbutane phase, which corresponded in amount to a conversion of 68% based on the tetramethylene oxide used, and a yield of 80%.

The above example illustrates the preparation of 1,4-dichlorbutane using tetraethyl ammonium chloride as catalyst. The corresponding dibromide may be prepared in the same manner by employing hydrogen bromide in place of hydrogen chloride. In general the reaction with hydrogen bromide proceeds with better conversions than the reaction with hydrogen chloride. Other amine salts of the above type may be used as the catalyst in the method of the above example or in the continuous method. Thus, tetramethyl ammonium chloride, triamylamine hydrochloride and the like, or the corresponding bromides, may be used with good results.

The hydrogen chloride or hydrogen bromide is preferably added to the reaction medium in the form of an anhydrous gas although concentrated aqueous solutions thereof may be used if desired.

When employing primary, secondary or tertiary amine hydrohalides as catalysts using an excess of tetramethylene oxide, there may be a tendency for free amine to be generated in the reaction mixture. This is particularly the case when a temperature above about 140° is used. Where the amine is a high boiling compound and is not removed rapidly from the mixture at the temperature of operation, such free amine that may be formed may be reconverted to the hydrogen halide by occasionally passing a slight excess of the hydrogen halide into the reaction mixture.

I claim:

1. A method of producing a 1,4-dihalobutane comprising reacting tetramethylene oxide in the liquid phase at a temperature of 60° to 200° C. with a hydrogen halide from the group consisting of hydrogen chloride and hydrogen bromide in the presence of a compound of the formula

wherein each R is from the group consisting of hydrogen and alkyl and aralkyl radicals Y is an alkyl radical and X is a halogen from the group consisting of chlorine and bromine.

2. The method of claim 1, wherein the reaction is carried out at a temperature of 100° to 140° C.

3. A method of producing 1,4-dichlorbutane comprising reacting tetramethylene oxide in the liquid phase at a temperature of 60° to 200° C. with hydrogen chloride in the presence of a compound of the formula

wherein each R is from the group consisting of hydrogen and alkyl and aralkyl radicals, Y is an alkyl radical and X is a halogen from the group consisting of chlorine and bromine.

4. The method of claim 3, wherein the reaction is carried out at a temperature of 100° to 140° C.

5. The method of claim 3, wherein the compound of the formula

is tetraethyl ammonium chloride and the reaction is carried out at a temperature of 100° to 140° C.

6. A method of producing 1,4-dichlorobutane comprising reacting tetramethylene oxide in the liquid phase at a temperature of 60° to 200° C. with hydrogen chloride in the presence of an aliphatic tertiary amine hydrochloride.

7. The method of claim 6 wherein the amine hydrochloride is triamylamine hydrochloride and the temperature is 100° to 140° C.

8. A method of producing 1,4-dichlorobutane comprising reacting tetramethylene oxide in the liquid phase at a temperature of 60° to 200° C. with hydrogen chloride in the presence of a tetraalkyl ammonium chloride.

9. The method of claim 8 wherein the tetraalkyl ammonium chloride is tetramethyl ammonium chloride and the temperature is 100° to 140° C.

NORMAN D. SCOTT.

REFERENCES CITED

The following references are of record in the file of this patent:

UNITED STATES PATENTS

| Number | Name | Date |
|---|---|---|
| 2,168,167 | Leuchs | Aug. 1, 1939 |
| 2,222,302 | Schmidt et al. | Nov. 19, 1940 |

FOREIGN PATENTS

| Number | Country | Date |
|---|---|---|
| 624,693 | Germany | Jan. 30, 1936 |

OTHER REFERENCES

Beilstein: "Handbuch der Organischen Chemie," vol. 17, page 10.

Ser. No. 334,582 (A. P. C.), published June 8, 1943.